UNITED STATES PATENT OFFICE.

JEAN BAPTISTE DUPRET, OF BRUSSELS, BELGIUM.

COMPOUND FOR WATERPROOFING BOOTS, SHOES, &c.

SPECIFICATION forming part of Letters Patent No. 323,402, dated August 4, 1885.

Application filed May 13, 1885. (No specimens.)

*To all whom it may concern:*

Be it known that I, JEAN B. DUPRET, a citizen of the Kingdom of Belgium, residing at Brussels, in Belgium, have invented certain new and useful Improvements in Process of Waterproofing Boots, Shoes, and other Articles; and I do hereby declare the following to be a full, clear, and exact description of the invention, such as will enable others skilled in the art to which it appertains to make and use the same.

This invention relates to an improved composition for waterproofing, strengthening, and preserving leather, wood, or metal or objects and articles made therefrom; and it consists, essentially, in a compound of vegetable tar and alumina alone or associated or combined with other substances, substantially as hereinafter fully described, and as specifically set forth in the claims.

In carrying out my invention, I prepare the compound of alumina and vegetable tar in any convenient or preferred manner, either by mixing therewith alumina in a pasty form obtained by the decomposition of an aluminium oxide or an alumina salt, with the addition of alcohol or ether if necessary, and by means of heat; or the alumina may be mixed with the vegetable tar by forming a solution of alum or of sulphate or acetate of alumina in ammonia, or by forming such solutions in any other manner, and mixing the same with the tar, the uncombined water being decanted and the compound then heated and thoroughly mixed from time to time, until no more bubbles are formed on the surface. The heating should not be effected by bringing the vessel containing the compound in direct contact with fire, but said heating should be effected by placing the vessel either in a water, steam, or hot-air bath, and earthen or porcelain vessels should be used for this purpose.

As an example, I will proceed to describe the manner of obtaining an aluminated tar containing ten per cent. of an alumina salt. I take ten kilograms of vegetable tar and melt it by placing the earthen or porcelain vessel in a water bath, and to this melted tar I mix a solution of one kilogram of pulverized alum in twenty liters of water, to which I add five hundred grams of ammonia. The solution is then added to the melted tar, and the whole agitated and thoroughly mixed, the free water being decanted therefrom. This aluminated tar or mixture of tar and alumina serves as a means for preserving, strengthening, and waterproofing articles or materials of great variety, either in a pasty form or in such a form as to render it applicable by means of a brush, sponge, or rag.

The said compound also serves as a basis for preserving, strengthening, and waterproofing compounds by mixing therewith other ingredients, substances, or chemicals.

When it is desired to use the aluminated tar, prepared as described, and which yet contains a certain volume of water, it is first heated until the formation of bubbles on the surface ceases. The compound will then be of a beautiful red-brown color, the alumina probably combining with the acetic acid in the tar to produce this result. The compound may then be passed through a sieve or other suitable straining device to remove any foreign or undissolved matter therefrom and applied to the article.

I have also obtained good results in aluminating the tar by mixing therewith a condensed solution of acetate of alumina obtained by the decomposition of alum with acetate of lead either by slow evaporation or by means of gums, resins, or other similar intermediary substances or vehicles; also, by mixing with the tar acetate of alumina obtained by dissolving a salt of alumina in acetic acid and mixing it with a siccative oil or olive-oil or other vegetable oil. In fact, I do not desire to limit myself to any particular mode or process of preparing the aluminated tar, which may be effected in any desired or preferred manner by combining or mixing the tar with alumina or any one of the salts thereof, either by itself or combined with another body, substance, or vehicle.

The percentage of alumina in the tar may be varied according to the uses made of the compound, and a compound highly charged with alumina may be prepared with a view to adding thereto other substances, ingredients, or chemicals to reduce the proportion of alumina and vary the density of the compound and its preserving, waterproofing, and strengthening properties. The proportion of these substances, ingredients, or chemicals may also be varied according to the uses made of the final compound, according to the degree of fluidity, and also according to the color it is intended the compound should have, and by the admixture of coloring-matter the color of the compound may be varied at will.

In the application of the compound to tanning and preserving of hides and leather, I mix therewith tallow, or, preferably, stearine or beeswax dissolved in an essential oil, such as essence of turpentine and turpentine and another oil or oils and alcohol, to impart to the compound a greater degree of fluidity. Thus, for instance, as a preserving and waterproofing compound, three parts of the aluminated tar may be mixed with one part tallow or stearine and one part beeswax dissolved or melted in its weight of essence of turpentine, and if a cheaper compound is desired the beeswax may be dispensed with in whole or in part, and replaced by tallow or stearine and turpentine or by Burgundy pitch. When it is desired to impart tanning properties to the compound, substances having such properties may be combined therewith in variable proportions, either in solution in water, alcohol, or ether. Decomposition of the object treated may, for instance, be arrested by mixing the aluminated tar with a decoction of nutgalls.

The tanning or waterproofing of hides or leather may be effected, according to their nature, either by steeping in the hot compound or by applying the latter to the article or material in any desired manner. Any excess of the compound not taken up by the material to which it is applied may afterward be removed by means of an essential oil, the material having first been exposed to heat in a suitable chamber, to permit the compound to thoroughly permeate the same.

In the treatment of boots and shoes with a view to the preservation and waterproofing of the material of which they are made, and also with a view of strengthening the said material, I employ vegetable tar highly charged with acetate of alumina, and expose the articles treated to a high temperature until the compound assumes the density of rubber, the said compound forming on the article a coat or covering resembling leather. To impart greater consistency to the compound pitch, bitumen, or coal-tar may be added to the compound. The boot or shoe may also be impregnated with a solution of gelatine, and the compound combined with a substance having tanning properties afterward applied.

In practice I employ for waterproofing boots and shoes a mixture of aluminated tar, stearine, and beeswax, melted in spirits of turpentine, as above set forth.

For waterproofing the soles and heels of boots and shoes, I preferably employ a hot bath, into which the boots or shoes are placed, so that the compound will permeate the soles and heels thereof, or said compound may be caused to penetrate into the leather by applying it to the part treated and then applying a hot iron. In this manner I may waterproof and strengthen boots and shoes made of very poor leather or leather combined with other materials.

It will be seen that the aluminated compound, either by itself or when mixed with other substances or chemicals, may be employed for a variety of purposes other than those already cited—as, for instance, it may be employed as a preservative for wood, as varnish for wood, stone, bricks, tiles, plaster, metals, paper, and woven fabrics, or for fibrous materials or articles made therefrom, such as ropes. It may be used on felting for roofing or other purposes, for waterproofing or varnishing paper; in fact, the compound may be employed to strengthen or waterproof and preserve almost any substance or material.

When combined with alcohol, ether, oils, essences, gums, or resins, a cheap paint or varnish is obtained, the color of which may be varied at will by adding any desired coloring matter or matters in any necessary or desired proportion. Thus, for instance, when tar is aluminated by means of a solution of alumina or a salt of alumina, in acetic acid, a compound of a very fine red-brown color is obtained from which a varnish can be made by the addition of alcohol. The tint of this compound may be varied at will from a very light red brown to an almost black color by adding thereto a solution of bitumen (jew's pitch) or asphaltum in essence of turpentine, in greater or less quantities, to vary the shade or tint of the compound.

To impart to the compound greater siccative properties, a siccative oil—such as boiled linseed-oil or a gummy or resinous substance usually employed in the manufacture of varnish—may be mixed therewith. Varnishes or paints of a pale color may be obtained by adding turpentine or paints of a pale color, and, if necessary, the tar may be discolored by any of the well-known processes and other coloring-matter added thereto.

The admixture of oils or essences with the tar should be conducted carefully, and if the substances do not readily mix, a little alcohol or liquid ammonia should be added.

The aluminated tar may be used, also, by mixing it with beeswax, for waxing floors, furniture, or coating marble, &c. When applied to metals, these should be first heated, whether the compound is applied in a hot or cold state.

Having now described my invention, what I claim is—

1. The herein-described preserving, strengthening, and waterproofing compound, or basis for such compounds, consisting of tar and alumina, or a salt of alumina, as described.

2. The herein-described compound, consisting of aluminated tar combined with other substances, ingredients, or chemicals, substantially as described.

3. The herein-described compound for waterproofing leather and other materials, consisting of aluminated tar, tallow, or stearine, beeswax, and turpentine, or their specified equivalents, substantially as described.

In testimony whereof I affix my signature in presence of two witnesses.

JEAN BAPTISTE DUPRET.

Witnesses:
HENRI RACLOT,
E. LABOISQUE.